United States Patent [19]

Reitsma et al.

[11] 3,768,075

[45] Oct. 23, 1973

[54] EXTENSIBLE MICROPROGRAM STORE

[75] Inventors: Jagchum Reitsma; Johannes Reinier Maria Sanders, both of Beekbergen, Netherlands

[73] Assignee: U.S. Philips Corporation, New York, N.Y.

[22] Filed: Oct. 22, 1970

[21] Appl. No.: 83,015

[30] Foreign Application Priority Data

Oct. 25, 1969 Netherlands .......................... 6916125

[52] U.S. Cl. .............................................. 340/172.5

[51] Int. Cl. .......................... G06f 9/06, G11c 17/00

[58] Field of Search .................................. 340/172.5

[56] References Cited

UNITED STATES PATENTS

| | | | |
|---|---|---|---|
| 3,302,183 | 1/1967 | Bennett et al. | 340/172.5 |
| 3,325,788 | 6/1967 | Hackl | 340/172.5 |
| 3,389,376 | 6/1968 | Packard | 340/172.5 |
| 3,391,394 | 7/1968 | Ottaway et al. | 340/172.5 |
| 3,404,378 | 10/1968 | Threadgold et al. | 340/172.5 |
| 3,432,810 | 3/1969 | Cordero | 340/172.5 |
| 3,444,527 | 5/1969 | Hartley et al. | 340/172.5 |
| 3,478,322 | 11/1969 | Evans | 340/172.5 |
| 3,585,600 | 6/1971 | Saltini | 340/172.5 |
| 3,599,176 | 8/1971 | Cordero, Jr. et al. | 340/172.5 |
| 3,665,426 | 5/1972 | Gross et al. | 340/172.5 X |
| 3,636,522 | 1/1972 | Buschmann et al. | 340/172.5 |

*Primary Examiner*—Paul J. Henon
*Assistant Examiner*—Melvin B. Chapnick
*Attorney*—Frank R. Trifari

[57] ABSTRACT

An extensible microprogramme store comprising an electrically invariable read only store (dead store) which can be extended by at least part of a destructive read store (living store) suitable for storing microprogramme words, the electrically invariable read store comprising microprogramme words containing a number of bits or group of bits (command lines) by which the microprogramme words contained in the living store can be selected and read from said living store. An ordering loop is provided between the "dead" and "living" stores, whereby a microprogramme word in the living store references a dead store address so that a new dead store-living store cycle can commence.

7 Claims, 2 Drawing Figures

INVENTORS
JOGCHUM REITSMA
JOHANNES R. M. SANDERS
BY
Frank R. Trifari
AGENT

INVENTORS
JOGCHUM REITSMA
JOHANNES R.M. SANDERS
BY
Frank R. Trifari
AGENT

EXTENSIBLE MICROPROGRAM STORE

The invention relates to a microprogramme store having a possibility of extension and being formed by an electrically invariable read only store (dead store), in which the microprogramme word places are filled with one or more microprogramme commands (command lines), and comprising furthermore a dead store output buffer register.

BACKGROUND OF THE INVENTION

It is common practice in a computer to register the microprogramme words in a read-only store = electrically invariable read store (termed dead store hereinafter). This has several reasons. In the first place the command lines of the microprogramme words are not subjected to variations. Once registered, they must not be modified. A dead store provides the certainty that the command lines once registered therein cannot be affected permanently by disturbing external phenomena. (Command lines are defined herein, as a part of the microprogramme word of said "dead store" comprising a bit or a group of bits providing an activating signal for controlling another computer component, such as a "living store" as will be described hereinafter.) The construction of a dead store is in general such that its rate of operation is considerably higher than that of a "living" (non destructive) store. This is important because the rate of operation of the microprogramme in the frame of a macroprogramme plays an important part, since a macroprogramme comprises many references to microprogrammes (so-called instructions) so that with a rapid execution of the relevant microprogramme parts the rate of execution of a macroprogramme is also high.

A dead store has, however, the disadvantage that it is expensive. In extending the instruction scope of a computer it is endeavoured to minimize the bulk of the dead store. A known solution consists in that the dead store is filled as far as possible with microprogramme words including only one or a restricted number of command lines. This has the advantage that the microprogramme words may be used more generally. This may be accounted for as follows. If the programme comprises an instruction "add and shift," this may be recorded in the microprogramme in a single microprogramme word having two command lines, i.e. one for the instruction "add" and one for the instruction "shift." If in addition separate instructions add and shift are possible in a programme, they have to be separately recorded in a microprogramme word of the dead store. Consequently, this requires additional space in the dead store. In this example, said solution means that the instruction having two command lines add and shift in itself is not included in the dead store, but that each command line is included as a separate microprogramme word. This means that in the programme not one step with the add and shift instruction can be included, but two steps, one for the add instruction and one for the shift instruction are required. In order to enable a selection of a correct order of succession of microprogramme words in the dead store for a given microprogramme, the destructive read store included in computers is used in said solution, where the addresses of the relevant microprogramme words are recorded in the non-destructive store in the desired order of succession. However, the intermediate use of the destructive read store considerably prolongs the time of occupation of the computer. Moreover, if the microprogramme of a computer has to be extended by a very special microprogramme, for example, a diagnosis microprogramme, such a microprogramme will occupy an additionally long time because in this case this microprogramme can be executed for the major part only with the aid of instructions of general type, since such a special instruction has to be split up into a number of more current instructions already recorded in the dead store.

SUMMARY OF THE INVENTION

The invention has for its object to obviate said disadvantage of prolongation of the computer time without the need for enlarging the dead store. The invention is based on the fact that extension of the microprogramme store is possible in that at least part of a living store may be employed for storing microprogramme words, for which purpose the dead store includes a number of command lines by which a microprogramme word stored in the living store can be selected and read from this living store.

It is thus possible to store microprogramme words in the living store. When such a microprogramme word is required, it is selected from the living store and recorded in a buffer store, from which the commands can be executed. Because the living store has a high storing capacity, it is not objectionable to fill a living store with very special microprogramme words. These microprogramme words may include a large number of command lines, which may be employed in common especially and, for example, exclusively for a given microprogramme. In the dead store only a few command lines need be available, which are used again and again for fetching the microprogramme words from the living store. The loss of time involved in ordering the microprogramme words from the living store is largely compensated for by the fact that such a microprogramme word may include a large number of command lines so that the frequency of ordering may be restricted. An additional advantage is that in a computer comprising a microprogramme store in accordance with the invention, no difficulties arise when subsequently extending the microprogramme set by a new special microprogramme, since in a simple manner, space may be made available in the living store, whereas no modifications or extensions need be carried out in the dead store itself.

It should be noted that the microprogramme words in the living store, in contrast to the microprogramme words in the dead store, may be modified by disturbances. However, such a modification can be detected by carrying out a parity test on the information selected from the living store. Otherwise such a parity test is also carried out on the words read from the dead store because during reading and transferring to the dead store, output buffer register disturbances may occur which interfere with the read information. In practice the microprogramme words from the living store find their way also to the dead store output buffer register so that a parity test applied to said buffer register may serve for the two kinds of microprogramme words.

A simple embodiment of the microprogramme store in accordance with the invention has as its purpose the ordering a sequence of microprogramme words from the living store. The living store is characterized in that it comprises an address register containing the address of a microprogramme word in the living store, which address can be selected from the living store by a command line of the dead store. The associated microprogramme word can be read from the living store and the contents of the address register can be extended under the control of a further command line of the dead store so that the address of a next microprogramme word in the living store is formed therein, in order to obtain a next-following microprogramme word from the living store. A microprogramme word in the living store comprises a reference to a fixed address in the dead store, from which address a cycle for ordering the next-following living store microprogramme word can be started. In this way an ordering cycle is formed by which consecutive microprogramme words can be ordered from the living store. A further extension of said embodiment consists in that one of the microprogramme words stored in the dead store for ordering a microprogramme word from the living store essentially comprises zeros. When this microprogramme word is present in the dead-store output buffer register, the microprogramme word of the living store can be added thereto by a command line of the dead store, so that the living store microprogramme word is delivered from said dead store output buffer register. It is thus ensured that the command lines invariably start from one register, i.e., the dead store output buffer register.

The invention will now be described more fully with reference to the drawing.

DETAILED DESCRIPTION

Figure 1:
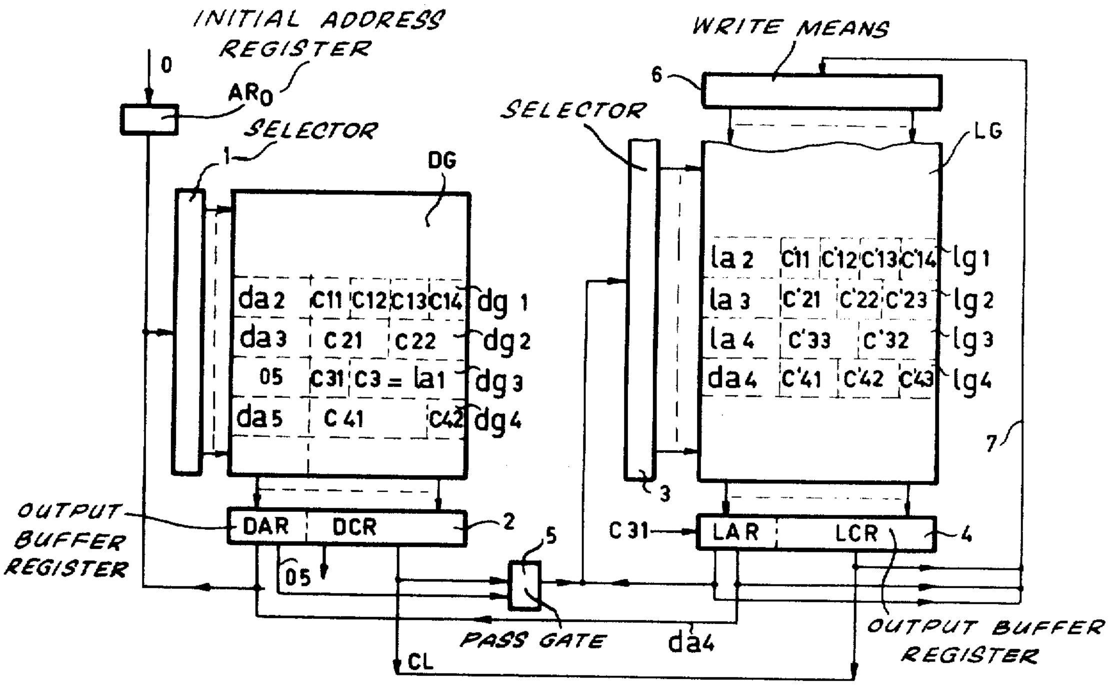
FIG. 1 shows schematically the set-up of a microprogramme store in accordance with the invention and FIG. 2 more in detail an embodiment of the microprogramme store in accordance with the invention.

It should be noted that corresponding parts are designated in both Figures by the same references. Where reference is made hereinafter to a line, this may also mean a bunch of lines, since as is quite usual, words may be transferred in parallel from one register to a further register. It should be noted explicitly that the embodiments described hereinafter do not limit the potential embodiments. In the diagram of FIG. 1 the non-destructive read store (dead store) is designated by DG and the destructive read store (living store) by LG. The living store may be referred to as a "working" or "internal" store. While generally referred to herein as a destructive store, the living store can have either a so-called destructive read out, or a so-called non-destructive read out (may be a two-core per bit) store. The dead store DG comprises selection means 1 and an output buffer register 2. The living store LG comprises selection means 3, an output buffer register 4 and write means 6 for rewriting information. $AR_0$ designates an initial address register, which can receive via its input 0 an address for a microprogramme word of the dead store from a computer (not shown) and/or from the living store. Reference numeral 5 designates a pass gate controlled via a line 05.

A typical dead store DG with selection means is to be seen in U.S. Pat. No. 3,585,607, and Electronics magazine, Sept. 30, 1968, page 147; or Dec. 23, 1968, page 37.

The living store LG may be of the type shown in the U.S. Pat. to Forrester, Pat. No. 2,736,880; also see Electronics Magazine, Jan. 20, 1969, Page 100.

The dead store DG contains microprogramme words $dg_1$, $dg_2$, etc. The living store LG contains inter alia words $1g_1$, $1g_2$, etc. A microprogramme word $dg_x$ and $1g_x$ respectively consist of an address part $da_x$ and $1a_x$, respectively, which indicates at least part of the address of a next-following word and can be stored in a portion DAR and LAR, respectively, of the respective registers 2 and 4. The microprogramme words $dg_x$ and $1g_x$ respectively comprise furthermore one or more command lines $cx_1$, $cx_2$, . . $c'x_1$, $c'x_2$, respectively. These command lines can be arranged in the buffer register portions DCR and LCR of the buffer registers 2 and 4 respectively.

The operation is as follows:

Suppose the initial register $AR_0$ contains the address of the dead-store microprogramme word $dg_1$. This address is indicated by the selection means 1 of the dead store DG in the latter and thus the microprogramme word $dg_1$ is transferred to the buffer register 2. The portion DAR of the buffer register 2 may have the address part $da_2$ of the next-following microprogramme word $dg_2$. The command lines $c_{11}$, $c_{12}$, $c_{13}$ and $c_{14}$ are present in the buffer register portion DCR, from which they can start via the output CL. By the command lines $c_{11}$ to $c_{14}$ the address $da_2$ selects the word $dg_2$ and the word $dg_2$ is read. This word $dg_2$ comprises command lines $c_{21}$ and $c_{22}$ and an address $da_3$ for the next-following dead store word $dg_3$. After this microprogramme word $dg_2$ has been processed, $dg_3$ is selected. The dead store word $dg_3$ comprises in this example an address part having a code 05, by which the pass gate 5 is set via the line 05 from the register portion DAR. The microprogramme word $dg_3$ has a command line $c_{32}$, i.e., the address $la_1$, which is transferred from the buffer register portion DCR by the opened gate 5 to the section means 3 of the living store. Thus the living store word $lg_1$ is read to the output buffer register 4. The microprogramme word $dg_3$ may include a command line $c_{31}$, by which the contents of register 4 (see input terminal $c_{31}$) are rewritten via line 7 in the living store with the aid of the write means 6. This microprogramme word $lg_1$ stored in the living store includes command lines $c'_{11}$ . . $c'_{14}$, passing from the output buffer register portion LCR via output CL. In this example the living store word $lg_1$ includes an address part $la$, which includes the address $la_2$ of the next-following living store word $lg_2$. From the register portion LAR this microprogramme word $lg_2$ can be selected by selection means 3. The living store element $lg_4$ comprises in this example an address part $da_4$ indicating the address of a dead store word $dg_4$. When this address is received in the register portion LAR, it ensures via the line $da_4$ that $dg_4$ is selected as a next-following microprogramme word, etc.

It will be apparent from this example that the microprogramme word $dg_3$ of the dead store DG passes to the living store in order to utilize a sequence of microprogramme words $lg_1$ to $lg_4$. After this sequence a return to the dead store is made. This may be repeated at will. In this way the dead store is extended by the living store.

Figure 2:
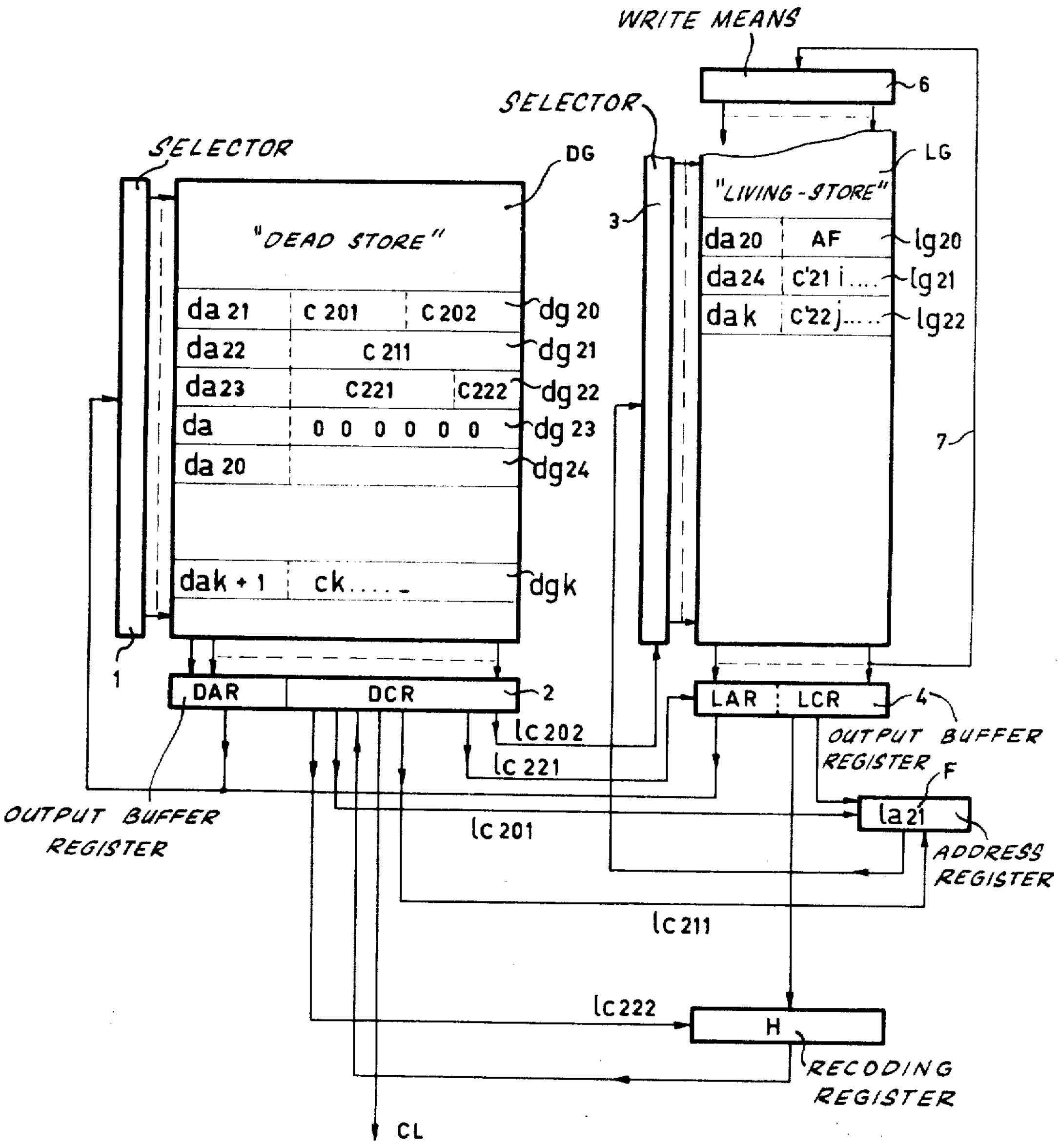

FIG. 2 shows an embodiment in which the dead store comprises a number of command lines in microprogramme words ($dg_{20}$ to $dg_{24}$) forming a loop by which any microprogramme word can be ordered from the living store. A microprogramme word in the living store may have a reference to a fixed dead-store address ($da_{24}$), from where a new ordering cycle can be started by said loop. In other cases a microprogramme word in the dead store referred to from a living store microprogramme word comprises a reference to a further address (daK) in the dead store, from which the process can be continued.

In this example it is assumed that a word read from the living store is automatically rewritten, i.e., via line 7 and in write register 6.

In contrast to FIG. 1 this embodiment comprises a further address register F and a recoding register H.

The operation will be explained with reference to an example.

It is assumed that the programme in the living store arrives at the address of the living store word $lg_{20}$. This refers to the dead store address $da_{20}$ for the dead store microprogramme word $dg_{20}$, which is the initial word of the ordering loop $dg_{20}$ to $dg_{24}$. From this living store word $lg_{20}$ reference is also made ($AF$) to an address register F, in which in this example the living store address $la_{21}$ is present. $la_{21}$ is the address of a living store microprogramme word $lg_{21}$. The dead store address $da_{20}$ is thus selected and the dead store microprogramme word $dg_{20}$ gets into the output buffer register 2. The portion DAR of register 2 then comprises the address $da_{21}$ of the next-following dead store word $dg_{21}$. The portion DCR of the register 2 comprises command lines $c_{201}$, $c_{202}$.

By the command line *c*201 via line *lc*201 register F is excited for carrying on the address ($la_{21}$) stored therein, — this address being maintained — to the selection means 3 of the living store. By the command line *c*202 via line *lc*202 an order to read this living store microprogramme word $lg_{21}$ is given simultaneously. During the time of this selection and reading the ordering cycle from the dead store continues: the dead store word $dg_{21}$ is selected with the address $da_{21}$ from the dead store. This microprogramme word $dg_{21}$ has a command line *c*211, by which via line *lc*211 the contents of the address register F are raised by such a step that the address interval between two living store microprogramme words is bridged. In this way the address of the next-following living store microprogramme word is already available in the address register F. Said microprogramme word $dg_{21}$ has a reference address $da_{22}$, which refers to the next-following dead store word $dg_{22}$. This word is also selected and it has a command line *c*221, by which via the line *lc*221 the word $lg_{21}$ then present in the output buffer register 4 of the living store LG is transferred to a recoding register H. In the register H the contents of register 4 are recorded for matching the dead store output buffer register 2, that is to say, the command lines and reference addresses are correctly ordered. The reference address $da_{24}$ of the word $lg_{21}$ has to get presently in the buffer register portion DAR of register 2. The dead store word $dg_{22}$ comprises furthermore a command line *c*222, which excites via line *lc*222 the recoding register H in order to transfer the information thereof to the buffer register 2 of the dead store itself. For a successful transfer the next-following dead store word $dg_{23}$ selected by the reference address $da_{23}$ of the word $dg_{22}$ comprises for the major part only zeros, which get into register 2. This also receives the information from register H, which results in filling the register 2 with the microprogramme word $lg_{21}$ from the living store. This word $lg_{21}$ includes command lines *c'*21*i* . . .passing through line CL. The word $lg_{21}$ comprises furthermore a reference address $da_{24}$, which completes in the buffer register portion DAR the reference address for the word $dg_{24}$, which is present in the dead store word $dg_{23}$ to form $da_{24}$. The living store microprogramme word $lg_{21}$ has thus referred to a fixed dead store address $da_{24}$, where the word $dg_{24}$ is found. The word $dg_{24}$ refers back to dead store word $dg_{20}$, which is selected and by which the ordering cycle is repeated. By this cycle the address $la_{21}$ + 1 of the living store is selected from the address register F so that the living store microprogramme word $lg_{22}$ is read. The word $lg_{22}$ includes, apart from the command lines *c'*22j . . . a reference address *da*K instead of $da_{24}$ so that at the termination of this cycle no new cycle is started; on the contrary, a further dead store word, i.e., *dg*K is selected and read. In a further stage of a programme or in a different programme an ordering cycle may be started by a reference to the dead store address $da_{20}$.

What is claimed is:

1. An extensible microprogramme store, comprising:
   A. an electrically invariable read only store defined as a "dead store" having means for selecting and reading microprogramme words from an alternate read store component;
   B. a read store being the alternate read store component of (A) defined as a "living store" having contained therein microprogramme words; and
   C. means defining an ordering loop arranged between said "dead store" and said "living store," wherein a microprogramme word passes from said "dead store" to said "living store" in order to utilize a sequence of said microprogramme words contained in the living store, a "dead store" - "living store" cycle being completed by a microprogramme word in said "living store" which contains and references a fixed "dead store" address, and whereby a new "dead store" - "living store" cycle can commence.

2. The extensible microprogramme store of claim 1, wherein said "living store" is further associated with an address register which contains the address of a microprogramme word in the "living store."

3. The extensible microprogramme store of claim 2, wherein the address of the microprogramme word contained in the address register can be selected from the "living store" by a command line of the "dead store" while its associated microprogramme word can be read from the "living store," and wherein contents of the address register can be extended under the control of an additional command line of the "dead store" so that the address of the next-following microprogramme word is formed in said "living store," said additional command line being defined as a part of the microprogramme word of said "dead store" comprising a bit or a group of bits providing an activating signal to said "living store."

4. The extensible microprogramme store of claim 3, wherein one of the microprogramme words stored in the "dead store" for the purpose of ordering a microprogramme word from said "living store" essentially comprises zeros, wherein this microprogramme word when present in an output buffer register associated with said "dead store" enables a microprogramme word of the "living store" to be added to said buffer register by a command line of said "dead store," whereby the microprogramme word of the "living store" can be delivered from said buffer register.

5. A method of extending an electrically invariable read only store, defined as a "dead store" by means of a read store defined as a "living store" and containing microprogram words, said microprogram words each containing and referencing a fixed "dead store" address, said method comprising the steps of:

A. passing a microprogram word from said "dead store" to said "living store" in order to utilize a sequence of said microprogram words contained in said "living store;"

B. selecting and reading a microprogram word from said "living store" in response to the passing of the microprogram word from said "dead store" to said "living store," the selected microprogram word containing a fixed "dead store" address thus completing a "dead store" - "living store" cycle, and whereby a new "dead store" - "living store" cycle can commence, and wherein subsequent cycles are controlled by said sequence of microprogram words contained in said "living store."

6. The method of claim 5, wherein said "living store" is associated with an address register which contains the address of a microprogram word in the "living store," and wherein the method further comprises the steps of:

C. selecting an address of the microprogram contained in the address register, while reading an associated microprogram word from said "living store," and D. forming the address of a next-following microprogram word in said "living store."

7. The method of claim 6, wherein one of the microprogram words stored in the "dead store" for the purpose of ordering a microprogram word from said "living store" comprises zeros and when this microprogram word is present in an output buffer register associated with said "dead store," said method further comprises the steps of:

E. adding a microprogram word of the living store to said buffer register; and

F. delivering the living store microprogram word from said buffer register to said "dead store."

* * * * *